April 23, 1957 A. ROANO 2,789,442
REVERSIBLE GEARS HAVING HELICOIDAL TEETH AND PARALLEL AXES
Filed Aug. 12, 1954 2 Sheets-Sheet 1

United States Patent Office 2,789,442
Patented Apr. 23, 1957

2,789,442

REVERSIBLE GEARS HAVING HELICOIDAL TEETH AND PARALLEL AXES

Alessandro Roano, Naples, Italy, assignor to Sira Societa Italiana Roano Alessandro Soc. p. Az., Genoa, Italy Application August 12, 1954, Serial No. 449,299

Claims priority, application Italy May 24, 1954

6 Claims. (Cl. 74—466)

Reversible gears having helicoidal teeth on parallel axes, in which the inclinations of the helices of the teeth of the pinion and of the teeth of the gear are different are known, the axial pitch both of the teeth of a gear wheel and of a pinion being the same, the contact being shifted respectively to the plane of the axes. In these gears the shape of the cross section of the teeth was quite particular, and particularly determined, so that difficulties in construction arose.

The present invention relates to reversible gears having helicoidal teeth, on parallel axes, in which the inclination of the helices of the teeth of the pinion and of those of the gear wheel are different, but having the same axial pitches both for the teeth of the gear wheel and of the pinion and having a contact shifted respectively to the plane of the axes, but having the shape of the cross sections of the teeth such as to obviate the above mentioned difficulties. Thus, besides lowering the cost for production of the teeth range, these teeth ranges are made with great exactness and are therefore capable of meshing with the highest efficiency.

The reversible gears having helicoidal teeth, on parallel axes, with differently inclined helices for the teeth of the pinion and the teeth of the gear wheel, but having the same axial pitch both for the teeth of the wheel and those of the pinion and with a contact shifted respectively to the plane of the axes are, according to this invention, characterised in that the side profiles of the section of the teeth in a plane perpendicular to the helix of the teeth, as well as in the plane perpendicular to the axis of the rotation and also in a plane passing through the rotation axis, are each constituted by a single arc of a circle both for the pinion and for the gear wheel.

The said gears are further characterised in that the centres of the arcs of circle of said profiles are, for the pinion, inside the tangent at the circle of the root line of the teeth, and, for the gear wheel, external to the outside circle of the teeth, so that the profiles constantly increase in thickness both for the pinion and for the gear wheel, from their tops to the root.

The gears are further characterised in that the contact between a tooth of the pinion and a tooth of the gear wheel occurs on a surface of contact that is shifted in relation to the plane of the axes and is quite outside it, on one or other side according to the direction of rotation, the outline, the extent and the distance from the plane of the axes of said surface of contact, being a function of the inclination of the helices of both the teeth of the gear wheel and of the pinion and having substantially the shape of a spherical triangle, with the shot side or base of the triangle in the direction towards to the plane of the axes and the longer curvilinear sides extending approximately in a direction about along the plane of the axes.

The gears are further characterised in that the vertex of the longer curvilinear sides of the triangle which constitute the perimeter of the contact surface is closer to the plane of the axes than the other side or base of the triangle.

The gears are also characterised in that the centre of gravity, which may be regarded as the balance centre of gravity of the points of the longitudinal median of the surface of contact, and at which centre of gravity the load between both teeth in contact may be considered to be concentrated, is placed closer to the root of the tooth of the pinion than to the root of the tooth of the gear wheel, and this corresponds to what is reasonably convenient in relation to the various thicknesses of the tooth-sections of both the pinion and the gear wheel; the consequence also is that the unitary pressure at the various points of surface contact is variable.

The gears are further characterised in that for each pinion-gear-wheel unit, the contact between whichever teeth of the pinion and the gear wheel respectively are in mesh for any particular direction of rotation of the unit, is fixed in space, has a constant shape and dimension and is constantly positioned during the rotation of the gears.

The said gears are finally characterised in that between the lateral sides of the cross section of the teeth and the cylinders of the roots of the teeth and between the outside line of the teeth and the lateral sides of said cross section well rounded lines are provided in order to eliminate those parts of the teeth where the highest unitary pressure occur.

In the accompanying drawings the invention is shown only by way of an example in one of its embodiments in the form of gears having double-helical teeth, that is presenting two rims, for the known purpose of obviating axial stresses; but the gears could also be provided with a single rim.

Figure 3:
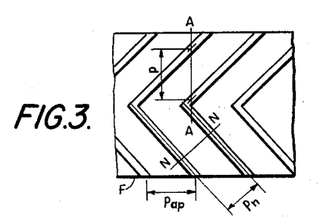
Figure 3 is a plan view of one part of one gear wheel where the various pitches of the toothing are shown.

The helicoidal toothing, that is the helicoidal teeth both of the gear wheel and of the pinion (Figure 3) has the normal pitch $p_n$ given on a sectional plane N—N perpendicular to the helices of which the teeth are a part, an apparent pitch $p_{ap}$ as seen from the side F of the gear wheel or pinion and an axial pitch $p$ given by a section on line A—A, parallel to the axis of rotation of the gear wheel or pinion; the values of the pitches of the helices from which the helicoidal teeth are formed will be designed by particular and different symbols.

In the gear wheel and pinion according to the invention the teeth ranges both of the pinion and of the gear wheel have the same axial pitch.

According to the invention the teeth of the pinion (Figure 1) have a particular cross sectional profile constituted by two lateral sides, each one having the shape of an arc of circle $p$ the centres C of which are within the circumference $\zeta$ of roots of the teeth. The teeth present at their root a well rounded line B the radius of which does not exceed the known value of $\frac{1}{7}$ of the height of the tooth, whilst the edges S are slightly rounded with a well rounded line equal to about $\frac{1}{3}$ of the well rounded line used for the root at B, in order to eliminate those zones in which there would be the highest unitary pressure. The same particularities are to be noted in the sections of the teeth of the gear wheel as shown in Figure 2, but with radii $p'$ having different values and with centres C' analogously disposed but, for the gear wheel, outside the outside circle $\zeta'$ of the teeth.

Figure 1:
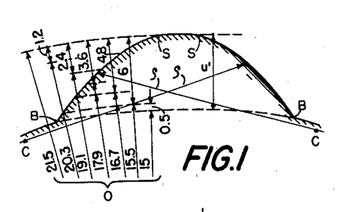
Figures 1 and 2 are cross sections, for instance in an axial plane, of the teeth both of a pinion and of a gear wheel and show the construction and characteristics of the teeth according to the invention. The following figures refers, by way of example, to a demonstration of the manner in which the invention is embodied.
Figure 2:
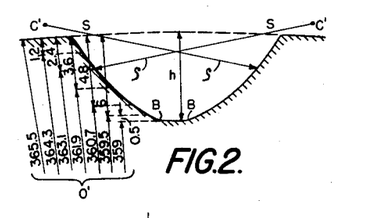

The sections shown in Figures 1 and 2 are sections along a plane parallel to the plane of the axes, but there would be analogous characteristics even should sections in the plane N—N (Figure 3), the plane A—A (Figure 3) or in a plane perpendicular to the axes of rotation of the wheel be considered. It will be appreciated that Figures 1 and 2 do not show the real sections of the teeth both of the pinion and the gear wheel, in scale and proportion as will appear from successive figures, but these figures are only for the purpose of explaining the characteristic shape of the teeth.

The other constructional characteristics of the gears, according to the invention will be apparent from the following example of an embodiment which is shown in order to enable the invention to be put into practice.

The following example of an embodiment refers to a pair of reversible gears, giving a transmission ratio $\tau=1:40$, the pinion having 2 teeth and the gear wheel having 80 teeth. The height of the teeth of the pinion and of the gear wheel (Figure 5) is $h=6.5$ mm. and these have an axial pitch (Figure 6).

$$p=28.575 \text{ mm.} \quad (1)$$

It follows that the helices from which the teeth of the pinion are obtained have an axial pitch $$p'=2\times 28.575=57.15 \text{ mm.} \quad (2)$$

and that the helices from which the 80 teeth of the wheel are obtained have an axial pitch $$p''=80\times 28.575=2286 \text{ mm.} \quad (3)$$

Suppose (Figures 5 and 6):  Mm.
External radius of the outside line of the teeth of the pinion___________________ 21.50
External radius or outside line of the teeth of the wheel_____________________ 365.50
Distance between the axes=OO'_________ 381

Figure 4:
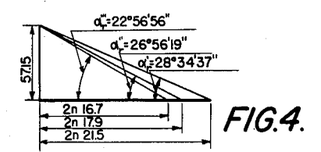
Figure 4 is an explanatory diagram showing the varying pitches of the helices for different positions along the lateral sides of the teeth.

For the following calculation it must be realised that the inclination $\alpha_R$ of the teeth of the gear wheel and $\alpha_r$ of the teeth of the pinion relative to the plane NN (Figure 6) perpendicular to the axes of the gear wheel and the pinion of course varies from the apices of the teeth towards their roots (see the view of the pinion in Figure 4). As the space remaining between the apex of one tooth and the bottom of the trough in which the tooth is working is considered to be 0.5 mm. the working height of the tooth is (Figure 1) 6 mm.; if this working height is divided into 5 portions and considering, both for the pinion and for the wheel, some of these heights, for each of which the values $\alpha_r$, and $\alpha_R$ respectively below are to be considered:

Pinion—
Height 4.80 mm.

$$\text{tg } \alpha'_r = \frac{p'}{2\pi(21.50-4.80)} = \frac{57.15}{2\pi(21.50-4.80)}$$

$$= \frac{57.15}{2\pi 16.70} = 0.544700$$

$\alpha'_r = 28°34'37''$ (Figures 1 and 4) \quad (4)

Height 3.60 mm.

$$\text{tg } \alpha_r'' = \frac{p'}{2\pi(21.50-3.60)} = \frac{57.15}{2\pi(21.50-3.60)}$$

$$= \frac{57.15}{2\pi 17.90} = 0.508180$$

$\alpha_r'' = 26°56'19''$ \quad (5)

Zero height (head of the teeth)

$$\text{tg } \alpha_r''' = \frac{p'}{2\pi 21.50} = \frac{57.15}{2\pi 21.50} = 0.423082$$

$\alpha_r''' = 22°55'56''$ (Figs. 1 and 4) \quad (6)

Gear wheel—
Depth zero (apex of the tooth)

$$\text{tg } \alpha_R' = \frac{p''}{2\pi 365.50} = \frac{2286}{2\pi 365.50} = 0.995427$$

$\alpha_R' = 44°52'7''$ (Figure 2) \quad (7)

Depth 1.20 mm.

$$\text{tg } \alpha_R'' = \frac{p''}{2\pi(365.50-1.20)} = \frac{2286}{2\pi(365.50-1.20)}$$

$$= \frac{2286}{2\pi 364.30} = 0.998706$$

$\alpha_R'' = 44°57'46''$ (Figure 2) \quad (8)

Depth 2.40 mm.

$$\text{tg } \alpha_R''' = \frac{p''}{2\pi(365.50-2.40)} = \frac{2286}{2\pi(365.50-2.40)}$$

$$= \frac{2286}{2\pi 363.10} = 1.002077$$

$\alpha_R''' = 45°3'26''$ (Figure 2) \quad (9)

Depth 6 mm.

$$\text{tg } \alpha_R'''' = \frac{p''}{2\pi(365.50-6)} = \frac{2286}{2\pi(365.50-6)}$$

$$= \frac{2286}{2\pi 359.50} = 1.012007$$

$\alpha_R'''' = 45°20'33''$ (Figure 2) \quad (10)

If a section is made of the teeth of the pinion with the external cylindrical surface of the gear wheel (radius=mm. 365.80) along $abc$ (Figure 5) in the section in plan (Figure 6) there may be seen the apices A—A of two successive teeth of the gear wheel; the above obtained (7) inclination $\alpha_R'=44°52'7''$ of the teeth of the wheel in correspondence with the apex and the inclination XX of the teeth of the wheel respectively to the plane NN; the above obtained (6) inclination $\alpha_r'''=22°55'56''$ of the teeth of the pinion at their head and the inclination YY of the teeth of the pinion respectively to the plane NN; the axial pitch considered above (1) $p=28.575$ mm. of the gears; the normal pitch of the teeth of the wheel in correspondence to the head of the teeth $p \cos \alpha_R' = 28.575 \times \cos 44°52'7'' = 28.575 \times 0.708727 = 20.25$ mm.

When from point $a$ (Figure 5) a parallel line is drawn to the OO' which connects the centres, so as to meet NN, the points B, $n$, S, D, N are defined. Supposing, by way of hypothesis only, that in $a$ a contact is wanted between both the tooth of the gear wheel and that of the pinion, the distance $nD$ has to correspond to half the thickness of the apex of the teeth of the pinion plus half the thickness of the apex of the teeth of the wheel.

In order to define the value $nD$ it has to be considered that $$nD = BD - Bn$$

but $$\cos a\hat{O}O' = \frac{OO'^2 + Oa^2 - aO'^2}{2\,OO' \times Oa} = \frac{381^2 + 21.50^2 - 365.50^2}{2 \times 381 \times 21.50}$$
$$= 0.734480$$
$$a\hat{O}O' = 42°44'11''$$

Now if one helix of the pinion for a complete rotation (360°) advances axially (see (3)) for $p' = 57.15$ mm., the portion of the helix corresponding to an angle of 42°44'11'' advances for a length BD (Figure 6)

$$BD = p'\frac{42°44'11''}{360°} = 57.15\frac{42°44'11''}{360°} = 6.78 \text{ mm.} \quad (11)$$

Analogously for the wheel:

$$\cos a\hat{O}'O = \frac{Oa^2 + OO'^2 - Oa^2}{2\,OO' \times O'a} = \frac{365.50^2 - 381^2 - 21.50^2}{2 \times 381 \times 365.50}$$
$$= 0.999202$$
$$a\hat{O}'O = 2°17'20''$$
$$BD = p''\frac{2°17'20''}{360°} = 2286\frac{2°17'20''}{360°} = 14.53 \quad (12)$$

But (Figure 6)

$$nH = O''r' = \frac{p}{2} = \frac{28.575}{2} = 14.287 \text{ mm.} \quad (13)$$

and therefore, owing to (12) and (13):

$$Bn = BH - nH = 14.53 - 14.287 = 0.243 \text{ mm.} \quad (14)$$

so that, owing to (11) and (14), it results that $$nD = SD - Bn = 6.78 - 0.243 = 6.53 \text{ mm.} \quad (15)$$

Figure 8:
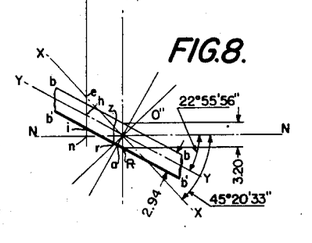

By limiting now (Figure 8) the thickness of the heads of the teeth of the pinion seen in direction NN for $$3.20 \text{ mm.} \quad (16)$$

it results that $$SD = \frac{3.20}{2} = 1.60 \text{ mm.} \quad (17)$$

and therefore (Figure 6), owing to (15) and (17):

$$nS - nD = SD = 6.53 - 1.60 = 4.93 \text{ mm.} \quad (18)$$

and therefore further, the thickness of the head of the teeth of the wheel, seen in direction NN, will be, owing to (18):

$$4.93 \times 2 = 9.86 \text{ mm.} \quad (19)$$

and the width of the gaps of the gear wheel, at its external periphery, always seen in direction NN, is (Figure 6) considering (1):

$$p - 9.86 = 28.575 - 9.86 = 18.71 \text{ mm.} \quad (20)$$

It is now possible to calculate the thickness of the head of the teeth of the pinion (Figure 8); considering (16) and (6) it results that the said thickness is (Figure 8):

$$bb' = 3.20 \cos 22°55'56'' = 3.20 \times 0.920967 = 2.94 \text{ mm.} \quad (21)$$

By now remarking that the arc $fd$ (Figure 7) corresponds to the complete working height of the teeth of the wheel and which, in the direction of the line connecting the centres OO', is 6 mm.

Figure 7:
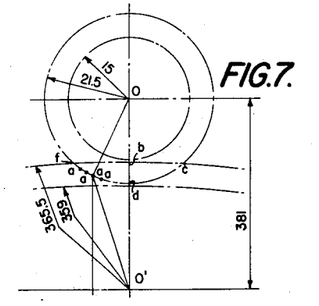
Figures 7 and 8 are analogous views of the pinion and a portion of the gear wheel in plan, and on a larger scale and of the head of one tooth of the pinion.

Divide the arc $fd$ in the same above mentioned portions 5, obtaining on it the points $a, a, a, a$, spaced from one another for a distance of $6:5 = 1.20$ mm., measured parallel to the line connecting the centres.

Figure 5:
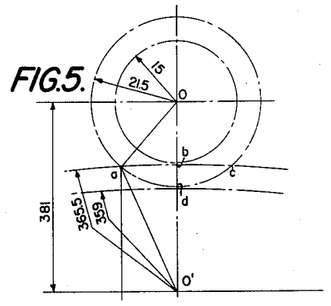
Figure 5 is a side view of the pinion and a part of the gear wheel and Figure 6 is a plan view of a portion of the teeth of the gear wheel.
Figure 6:
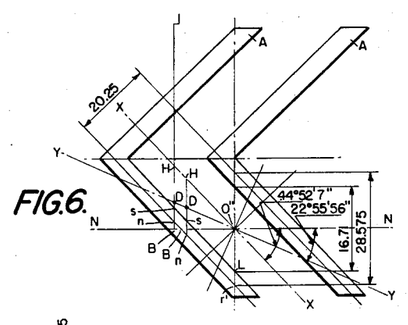

Considering now the condition that there should be contact between the tooth of the wheel and that of the pinion in correspondence for instance to the third point $a$ from $f$ towards $d$ (Figure 7), that is corresponding to the depth of 3.60 mm. for the gaps of the gears, and proceeding analogously to Figures 5, 6.

From the said point $a$ a parallel to the line OO' is drawn of sufficient length as to meet the line NN so as to define the points $n, i, h, e$; thereby double the distance $ie$ is the width of the gaps of the wheel, at a depth of 3.60 mm., the width by which it is possible to obtain contact with the apex threads $bb$ of the teeth of the pinion at the said third point $a$.

The said distance $ie$ is obtained by noting that it is:

$$ie = hi + he$$

Analogously to the results obtained from Figures 5, 6 results are obtained from Figures 7, 8 in which the considered point $a$ is:

$$O'a = 365.50 - 3.60 = 361.90 \text{ mm.}$$

$$\cos a\hat{O}O' = \frac{OO'^2 + Oa^2 - O'a^2}{2\,OO' \times O'a} = \frac{381^2 + 21.50^2 - 361.90^2}{2 \times 381 \times 21.50}$$
$$= 0.894319$$
$$a\hat{O}O' = 26°34'45'' \quad (22)$$

If one helix of the pinion, in rotation (360°) axially advances (see (2)) for a pitch $p' = 57.15$ mm., the portion of helix corresponding to an angle of 26°34'45'' advances for a portion $nh$ (Figure 8)

$$nh = 57.15\frac{26°34'45''}{360°} = 4.21 \text{ mm.} \quad (23)$$

Analogously for the wheel:

$$\cos a\hat{O}'O = \frac{OO'^2 + O'a^2 - Oa^2}{2\,OO'O'a} = \frac{381^2 + 361.90^2 - 21.50^2}{2 \times 381 \times 361.90}$$
$$a\hat{O}'O = 1°31'30'' \quad (24)$$

If one helix of the wheel, in one rotation (360°) axially advances (see (3)) for a pitch $p'' = 2286$ mm., the portion of the helix corresponding to an angle of 1°31'30'' advances for a length $ne$ (Figure 8):

$$ne = 2286\frac{1°31'30''}{360°} = 9.68 \text{ mm.} \quad (25)$$

But in consequence of (23) and (25):

$$he = ne - nh = 9.68 - 4.21 = 5.47 \text{ mm.} \quad (26)$$

whilst (Figure 8):

$$hi = O''R = \frac{3.20}{2} = 1.60 \text{ mm.} \quad (27)$$

so that in consequence of (26) and (27) there is:

$$ie = hi + he = 1.60 + 5.47 = 7.07 \text{ mm.}$$

and therefore the width of the gaps between the teeth of the wheel at a depth of 3.60 mm. and seen in direction NN is:

$$7.07 \times 2 = 14.14 \text{ mm.} \quad (28)$$

The width of the gaps of the gear wheel at the depth of 6 mm. and seen in direction NN is (Figure 8) $2 \times zr$. In order to calculate $rz$, note (Figure 8) that considering (6), (10) it is:

$$aO'' = \frac{2.94}{2} = 1.47 \text{ mm.}$$

$$rO'' = \frac{aO''}{\cos(\alpha_R''' - \alpha_r''')} = \frac{1.47}{\cos(45°20'33'' - 22°55'56'')}$$
$$= \frac{1.47}{\cos 22°24'37''} = \frac{1.47}{0.924478} = 1.59$$

$$rz = \frac{1.59}{\cos \alpha_R''''} = \frac{1.59}{\cos 45°20'33''} = \frac{1.59}{0.702868} = 2.26 \text{ mm.}$$

and therefore the width of the gaps of the wheel, at a depth of 6 mm., is:

$$2 \times 2.26 = 4.52 \text{ mm.} \quad (29)$$

Owing to the condition stated of a contact between the apex threads of the teeth of the pinion and the spacings of the wheel along the axis $f$, $d$, $a$ (Figure 7) the widths of the gaps of the gear wheel were thus determined as follows:

At the external periphery (point $a$) = 18.71 mm. (20)
At the depth of 3.60 mm. (point $d$) = 14.14 mm. (28)
At the depth of 6 mm. (point $f$) = 4.52 mm. (29)

Figure 9:
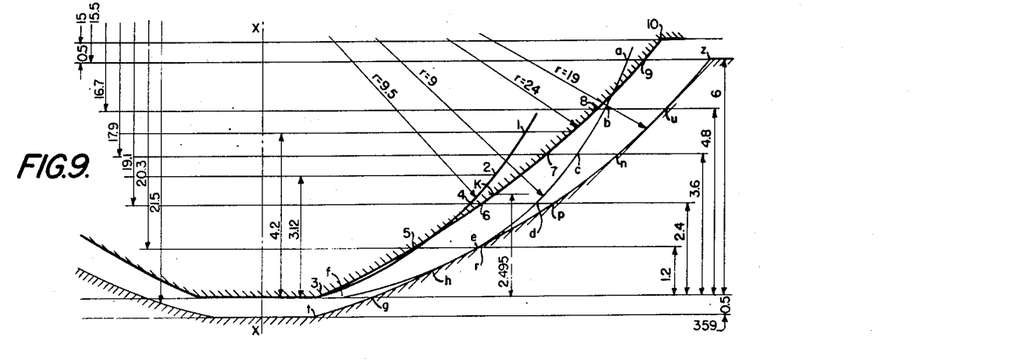
Figure 9 is a drawing for defining the definitive sizes of the cross sections of the teeth of the pinion and of the gaps between the teeth of the gear wheel.

Considering now the axis $x-x$ (Figure 9) as the symmetry axis of the cross section of the gap between the teeth of the gear wheel, drawn with a plane parallel to the plane OO' of the axis and passing through the point $a$ (Figure 7), the points $a$, $d$, $f$, result in Figure 9. Draw an arc of a circle through these points; from Figure 9 it may be seen that such an arc has a radius $r=9$ mm.; from Figure 9 may then be found out the other width of the gap of the gear wheel, thus supposing as starting point corresponding to the other depths results appear as follows:

*Table I*

Width of the gap between the teeth of the gear wheel (Figure 9)

At depth zero:
   18.71 mm. as calculated in (20) __________ point $a$
At the depth of 1.20 mm.:
   17.70 mm. as results from ______________ point $b$
At the depth 2.40 mm.:
   16.24 mm. as results from ______________ point $c$
At the depth of 3.60 mm.:
   14.40 mm. as calculated in (28) __________ point $d$
At the depth 4.80 mm.:
   11.06 mm. as results from ______________ point $e$
At the depth of 6 mm.:
   4.52 mm. as calculated in (29) ___________ point $f$ These values, considered as starting points, will have further to be modified as will appear from the prosecution of the calculation.

Thus having assumed the provisional shape of the section of the gap between the teeth of the gear wheel, it is possible to proceed to define the dimensions of the teeth of the pinion of which till the present it is only known that the apices (16) have a thickness of 3.20 mm. when measured in direction NN (Figure 8).

Figure 10:
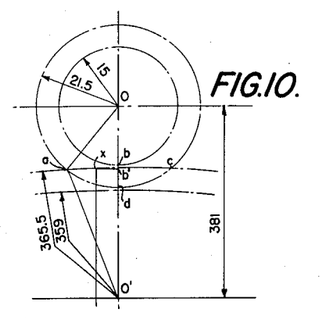
Figures 10, 11 are views analogous to those of Figures 5, 6 but used in order define the definitive values.
Figure 11:
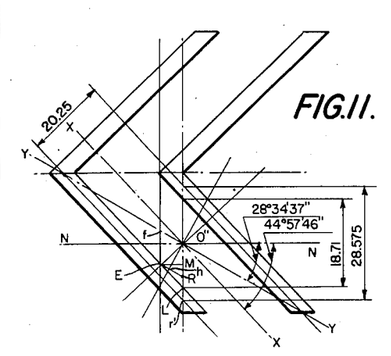

Let us now calculate the thickness of the teeth of the pinion corresponding to the depth of 1.20 mm. for the gaps of the gear wheel (Figures 10 and 11). As reference is made to a depth of 1.20 mm. for the gap between the teeth of the gear wheel and therefore at the height of 4.20 mm. for the tooth of the pinion, the inclination angle of direction XX of the tooth with respect to the NN for the teeth of the gear wheel there is $\alpha_R''=44°57'46''$ (see (8)) and the angle of inclination of direction YY of the teeth of the pinion with respect to the NN is $\alpha_r'=28°34'37''$ (see (4)). In this latter figure is further results in O''E perpendicular to XX, O''h perpendicular to YY, and ER parallel to YY.

In order to have a contact in E and only in E (Figure 1) it is of course necessary that the thickness of the teeth of the pinion, at said point should be 2 E$f$ that is 2 O''R; the question is to define the value of O''R. For this purpose assume that O''L is equal to one half of the width of the gap between the teeth, at the depth 1.20 mm. previously defined (Table 1) that is equal to one half of 17.70 mm. thus:

$$O''L = \frac{17.70}{2} = 8.85 \text{ mm.}$$

and therefore it results (from Fig. 11) that
$$P''E = 8.85 \cos 44°57'36'' = 8.85 \times 0.707563 = 6.26 \text{ mm.} \quad (30)$$

$O''h = O''E \cos (44°57'46'' - 28°34'37'')$
$= 6.26 \cos 16°23'9'' = 6.26 \times 0.959334 = 6.00 \text{ mm.} \quad (31)$
and $$O''R = \frac{O''h}{\cos 28°34'37''} = \frac{6.00}{0.878176} = 6.83 \text{ mm.} \quad (32)$$

It therefore happens that the thickness of the teeth of the pinion at the point E, seen along NN, is:

$$2 \times 6.83 = 13.66 \text{ mm.} \quad (33)$$

The distance EM of the point of contact $z$, seen from the plane OO' of the axes (see Figure 11) considering (30) and (8) is $$EM = O''E \sin 44°57'46'' = 6.26 \times 0.706646 = 4.42 \text{ mm.} \quad (34)$$

The said point of contact $z$ is substantially on the wheel 1.20 mm. in the inside from the external circumference having a radius of 365.50 mm. and it is therefore distant from O':

$$O'z = 365.50 - 1.20 = 364.30 \text{ mm.} \quad (34)$$

Projecting from said point of contact on the line OO' a point (Figure 10) $b'$ results for which, according to Pythagora's theorem and in consequence of both (34) there is:

$$O'b' = \sqrt{O''z^2 - EM^2} = \sqrt{364.30^2 - 4.42^2} = 364.27 \text{ mm.}$$
$$Ob' = OO' - O'b' = 381 - 364.27 = 16.73 \text{ mm.}$$

from which it further results (Fig. 10), in consequence of the afore result and of (34), the distance of the contact point $z$ from O:

$$Oz = \sqrt{Ob'^2 + EM^2} = \sqrt{16.73^2 + 4.42^2} = 17.30 \text{ mm.} \quad (35)$$

The contact point $z$ is therefore on the teeth of the pinion at a distance of:

$$21.50 = 17.30 = 4.20 \text{ mm.} \quad (36)$$

and this is in correspondence with the height of the tooth, so that it has a thickness of 13.66 mm. (see (33)).

It is therefore possible to mark in Figure 9 at the height of 4.20 mm. the point 1 distant from the middle line $x-x$ of Figure 9

$$\frac{13.66}{2} = 6.83 \text{ mm.}$$

Proceeding in the same way, it is possible to obtain the same figures for the contact of a point $r$ at a depth of 2.40 mm. of the teeth of the gear wheel and obtain the result that:

One half of the width of the gaps
  of the wheel at 2.40 mm. is____ 8.12 mm. (Table I)
One half of the thickness of the
  teeth of the pinion at the considered point $r$ is_______________ 6.10 mm. (37)
The distance of the point of contact $r$ from the plane of the
  axes is_____________________ 4.05 mm. (38)

(and keeping for the expressions O''b, Ob' Or the same meaning as they had above when the point $z$ was considered, but referring to it now as point $r$) it results that $$O'b_z' = 363.07 \text{ mm.}$$
$$Ob_z' = 17.93 \text{ mm.}$$
$$Or_z = 18.38 \text{ mm.}$$

The height of point $r$ of contact
  now considered on the teeth of
  the pinion becomes___________ 3.12 mm. (39)
The thickness of the teeth of the
  pinion in correspondence at the
  point of contact $r$ is now considered to be_________________ 12.20 mm. (40)

and therefore in Figure 9 at the height of 3.12 mm. the point 2 distant from the middle line x—x of Figure 9 is marked at $$\frac{12.20}{2} = 6.10 \text{ mm.}$$

Further in Figure 9 in correspondence with the apex of the teeth there is (see Figure 8) the width (16) of 3.20 mm. so that in Figure 9 it is possible to mark the point 3 distant from the middle line x—x of Figure 9 as $$\frac{3.20}{2} = 1.60 \text{ mm.}$$

The points 1, 2, 3 of Figure 9 may then be connected with an arc of a circle having a radius $r=9.50$ mm.; from the drawing therefore there is derived the provisional measures of the section of the teeth

Table II

The thickness of the teeth of the pinion (Figure 9)
At height of 4.20 mm.:
  13.66 mm. as calculated in (33)__________ point 1
At height 3.12 mm.
  12.20 mm. as calculated in (37)__________ point 2
At height zero:
  3.20 mm. as assumed in (16)_____________ point 3

Figure 12:
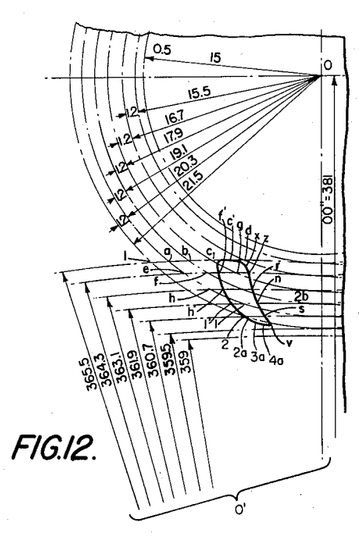
Figure 12 is a drawing, to a very large scale, for defining the position and the outline of the surface of contact between the teeth of the gear wheel and those of the pinion and Figures 13, 14 also on a very large scale, are views of the sections respectively of both the gaps between the teeth of the pinion and of the gaps between the teeth of the gear wheel for calculation relating to the embodiment shown as an example.
Figures 13, 14:
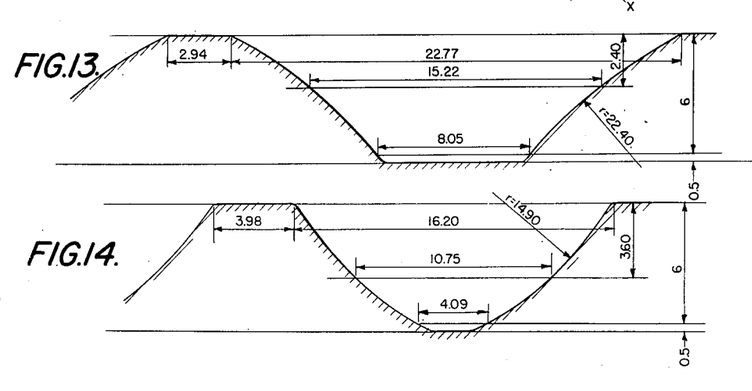

Consider now Figure 12, this shows the pinion and the meshing portion of the wheel; in this figure which is drawn to a scale which is three times larger than actual size there are marked the circumferences passing across the points at depth 1.20; 2.40, . . . 6.00 mm. of the teeth of the gear wheel and of the corresponding circumferences of the pinion. It is said that the line $d, f', h, z, v, n, d$ in Figure 12 limits and defines the surface of contact between the teeth of the gear wheel and those of the pinion. It will now be demonstrated what is affirmed above.

Considering point $f$, the point where the circumferences $fO=r=19.10$ mm. of the pinion and $O'f=r=364.30$ mm. of the gear wheel meet. Point $f$ is very near to point $f'$ of said outline which is the farthest from plane $OO'$ of the axes; the said point $f$ is 2.40 mm. in height on the teeth of the pinion at a depth of 1.20 mm. on the gaps of the wheel.

The thickness which the teeth of the pinion must have to obtain in $f$ (viz. practically in $f'$) a contact between the teeth of the pinion and those of the gear wheel will now be calculated (by considering the values just obtained for $O'f$ and for $Of$ and the value $OO'=381$ mm.)

$$\cos f\hat{O}O' = \frac{OO'^2 + O^2 - O'f^2}{2 \times OO' \times fO} = \frac{381^2 + 19.10^2 - 364.30^2}{2 \times 381 \times 19.10}$$

$$= 0.880249$$

$$f\hat{O}O' = 28°19'32''$$

If one helix of the pinion in a complete rotation (360°) axially advances for a pitch $p'=57.15$ mm. (see (2)), for an angle of 28°19'32'' it will advance for $$57.15 \frac{28°19'32''}{360°} = 4.49 \text{ mm.}$$

This measure corresponds for the case and for the point just considered, at the dimension that in Figure 6 was indicated with BD and therefore it is possible to write $$BD_f = 4.49 \text{ mm.}$$

There further is $$\cos f\hat{O}'O = \frac{O'f^2 + OO'^2 - Of^2}{2 \times OO' \times O'f} = \frac{364.30^2 + 381^2 - 19.10^2}{2 \times 381 \times 364.30}$$

$$= 0.999690$$

$$f\hat{O}'O = 1°25'37''$$

If one helix of the wheel, in a complete rotation (360°), axially advances for $p''=2286$ mm. (see (3)), for an angle of 1°25'37'' it will advance $$2286 \frac{1°25'37''}{360°} = 9.06 \text{ mm.}$$

This measurement corresponds to the case and to the point just considered, to the dimension that in Figure 6 was indicated by SH, and it is possible to write $$BH_f = 9.06 \text{ mm.}$$

Remembering now that (Tab. I) with the width of the gaps of the gear wheel, at a depth of 1.20 mm. in 17.70 mm., it happens (still adopting for the symbols the conceptions indicated in Figure 6, but intending them to refer to point $f$ now considered) that:

$$SH_f = O''L_f = \frac{17.70}{2} = 8.85 \text{ mm.}$$

$$BS_f = BH_f - SH_f = 9.06 - 8.85 = 0.21 \text{ mm.}$$

$$SD_f = BD_f - BS_f = 4.49 - 0.21 = 4.28 \text{ mm.}$$

and therefore the thickness of the teeth of the pinion at the height 2.40 mm., seen in direction NN, satisfying the above is:

$$2 \times 4.28 = 8.56 \text{ mm.} \tag{41}$$

But, in Figure 9, by means of the arc 1, 2, 3, the point 4 of the pinion was defined, corresponding to the height 2.40 mm.; from the same drawing of Figure 9 (ten times actual size) there is derived the result that the thickness is 10.94 mm.; whilst above it appeared that for point $f$, where the height of the teeth of the pinion is also 2.40 mm., the corresponding thickness is (41) 8.56 mm.

It is therefore obvious that by, for the present, not modifying the teeth of the pinion according to arc 1, 2, 4, 3 (Figure 9) to render it possible that the teeth enter the gaps of the wheel, it is necessary to enlarge in the point $f$ the same gaps for $$19.94 - 8.56 = 2.38 \text{ mm.}$$

As will be remarked further on, this enlargement has to be once more modified.

But it is to be understood that these said gaps cannot be enlarged at the point $f$ without influencing the whole height. And further, it is desired that the full shape of the teeth of both the wheels shall each be absolutely a single arc of the circle, it is convenient to proceed to modify the provisional shape obtained above. One mode of modification, but not the only one, is as follows:

It has been remarked directly above, that the gaps of the gears at point $f$ (Figure 12) that is at the depth of 1.20 mm. for the gaps of the gear wheel that in Figure 9 correspond to the line 8, $b, u$ must be enlarged for 2.38 mm. Really, in order to satisfy the above mentioned requirement this enlargement of the gaps between the teeth of the wheel has to be more than 2.38 mm.

According to the present method of calculation, the real enlargement to consider for gaps between the teeth of the gear wheel and which is shown by the segment $bu$, both on the one and on the other side of the shape, that is that the one and the other side of the symmetry axis $x x$ of Figure 9, has to be equal to said complete enlargement of mm. 2.38, that is $$\frac{2.38}{2}$$

on each side, plus ⅘ of the portion $dp$ which in Figure 9 is found on the line at height 2.40. This portion $dp$ is to be discovered from the drawing of Figure 9. There is thus the arc $z, u, n, p, r, h, g, t$ (Figure 9) representing the definitive shape of the gaps of the gear wheel, realized with a single radius that in the drawing gives the result $r = 19$ mm. This arc is obtained by drawing it tangentially to the arc $fe$ of the shape $f, e, d, c, b, a$ and passing the point $y$ and $r$. The segment $or$ owing to the construction corresponds to 7/10 of the perpendicular to the chord of arc $fe$ which must be calculated from the drawing (Figure 9).

Thus the definitive measures of the gaps of the gear wheel, seen in direction NN, and found out from the drawing (Figure 9) are:

Table III

The definitive values of the widths for the gaps between the teeth of the gear wheel (resulting from curve $z, u, n, p, r, g, t$ in Figure 9) are:

At depth zero
    Width 22.96 __________________________ point $z$
At depth 1.20 mm.
    Width 20.82 mm _________________________ point $u$
At depth 2.40 mm.
    Width 18.34 mm _________________________ point $n$
At depth 3.60 mm.
    Width 15.24 mm _________________________ point $p$
At depth 4.80 mm.
    Width 11.28 mm _________________________ point $r$
At depth 6.00 mm.
    Width 5.80 mm __________________________ point $g$ In order now to calculate the definitive shape of the teeth of the pinion the procedure is as follows:

In Figure 12 the point of intersection $g$ is marked, in which the depth of the gaps between the teeth of the wheel is 1.20 mm. and the height of the teeth of the pinion is 3.60 mm. In order to define the thickness which the teeth of the pinion must have at the height 3.60 mm. for a contact in point $g$ the procedure is as follows: (keeping for BD, BH, SH and SD the same meanings as they had with reference to Figure 6, but, on the contrary, referring to point $g$ and fitting therefore this indication with the letter $g$ at foot):

$$\cos g\hat{O}O' = \frac{381^2 + 17.90^2 - 364.30^2}{2 \times 381 \times 17.90} = 0.936004$$

$$g\hat{O}O = 20°36'32''$$

$$BD_g = 57.15 \frac{20°36'32''}{360°} = 3.271 \text{ mm.}$$

$$\cos g\hat{O}'O = \frac{364.30^2 + 381 \times 17.90^2}{2 \times 364.30 \times 381} = 0.999850$$

$$g\hat{O}'O = 0°59'30''$$

$$BH_g = \frac{2286 \times 59'30''}{360°} = 6.314 \text{ mm.}$$

As at the depth of 1.20 mm. the width of the gaps of the wheel is 20.82 mm. (Table III) it thus happens that $$SH_g = \frac{20.82}{2} = 10.41 \text{ mm.}$$

$$BS_g = SH_g - BH_g = 10.41 - 6.314 = 4.096 \text{ mm.}$$

$$SD_g = BD_g + BS = 3.271 + 4.096 = 7.307 \text{ mm.}$$

It thus happens that the thickness which the teeth of the pinion must have at the height of 3.60 mm. in order to come in contact with the point $g$ is double the measurement just determined, that is:

$$7.367 \times 2 = 14.734 \text{ mm.} \qquad (42)$$

In Figure 9 therefore the point 7 was marked as distant from the middle line $x$—$x$ of the figure by $$\frac{14.734}{2} = 7.367 \text{ mm.}$$

The procedure for the other points $i$ and $l$ (Figure 12) is exactly the same obtaining: for point $i$, considering that the width of the gaps between the teeth of the wheel, at the depth of 2.40 mm., is 18.34 mm. (Table III) there is:

$$\cos i\hat{O}O' = 0.940223$$

$$i\hat{O}O' = 19°54'39''$$

$$DB_i = 3.160 \text{ mm.}$$

$$\cos i\hat{O}'O = 0.999839$$

$$i\hat{O}'O = 1°1'40''$$

$$BH_i = 6.526 \text{ mm.}$$

$$SH_i = \frac{18.34}{2} = 9.17 \text{ mm.}$$

$$BS_i = 9.17 - 6.526 = 2.644 \text{ mm.}$$

$$SD_i = 3.160 + 2.644 = 5.804 \text{ mm.}$$

The thickness which the teeth of the pinion must have at height 1.20 mm. in order to have a contact in $i$ must therefore be equal to:

$$2 \times 3.959 = 7.918 \text{ mm.} \qquad (44)$$

Therefore in Figure 9 the point 5 was marked at a distance from the middle line $x\ x$ of Figure 9 that is $$\frac{7.918}{2} = 3.559 \text{ mm.}$$

The thickness of the apex of the teeth of the gear wheel remains the same at mm. 3.20 (see (16)) and therefore in Figure 9 the point 3 is marked distant from the middle line $x\ x$ of Figure 9 by:

$$\frac{3.20}{2} = 1.60 \text{ mm.}$$

The points 3, 5, 6, 7 may be connected by a single arc of a circle having a radius that, from the drawing, gives the result $r=24$ mm. and which extends also to include the points 8, 9, 10.

There is thus the definitive shape of the teeth of the pinion, seen in direction NN, in the arc 10, 9, 8, 7, 6, 5, 3 and the various dimensions result:

Table IV

Definitive values of the thickness of the teeth of the pinion:

At height of 6 mm.
    Thickness 19.60 mm. resulting from the
      drawing in Figure 9 ____________________ point 9
At height of 4.80 mm.
    Thickness 17.36 mm. resulting from the
      drawing of Figure 9 ____________________ point 8
At height of 3.60 mm.
    Thickness 14.73 mm. resulting from
      the calculation __________________ point 7  (42)
At height 2.40 mm.
    Thickness 11.608 mm. resulting from
      calculation ______________________ point 6  (43)
At the height of 1.20 mm.
    Thickness 7.918 mm. resulting from
      calculation ______________________ point 5  (44)
At height zero
    Thickness 3.20 mm. taken for calcula-
      tion ______________________________ point 3  (16)

From the values of the Tables III and IV thus obtained for sections made in a plane parallel to the axis OO' and seen in direction NN, it is evident that it is possible directly to obtain, by means of simple trigonometric calculations, both the measurements for the section of the gap between the teeth of the wheel, made with a plane perpendicular to the helix corresponding to which this gap is placed, as well as the measures for the sections of the tooth of the pinion, made in a plane perpendicular to the helix corresponding to which said tooth is disposed.

It is to be remembered that for the gap between the teeth of the wheel, the arc $a, b, c, d, e, f$, Figure 9, was determined as the starting point so that it is possible to have the contact simultaneously, and this continually, between the same arc and the threads (exterior edges) of the apices of the teeth of the pinion; is the same Figure 9 the said apex threads evidently correspond to point 3. The arc $a, b, c, d, e, f$, was successively definitely modified according to are $z, u, n, p, r, h, g, t$. So that of the original arc $a, b, c, d, e, f$, only that small portion is remained in which the said arcs are practically coincident, that is the portion has remained which begins at point $h$ and ends where the two curves part from each other towards point $e$. It can then be admitted that in the said portion there is a contact with thes apex threads of the teeth of the pinion. But although it is true that the two arcs are coincident, notwithstanding the two radii are different. It is further known that the inclination of the teeth of the gear wheel (Figure 4) varies by the variation of the height of each point of the said portion; and, considering that the axial pitch of the helices, from which the teeth of the gear wheel were taken, is rather long, that is (see (3)) 2286 mm., the variation resulting for the inclinations of the teeth of the wheel are substantial for each point of the said height.

In consequence of the above, it is evident that it is necessary in order to define the contact surface, to determine many points of contact very near one another, and then to connect them; but it is evident that, with reference to each single point, it is necessary to consider the inclinations of the teeth both of the pinion and the gear wheel.

It is to be remembered that the definitive shape of the section of the teeth of the pinion has been calculated so that there may be a contact in the points $g, i$ and $l$ (Figure 12). There is no doubt that the contacts will happen at given points, as the thicknesses which the teeth of the pinion must have at the various heights, in order to make contact in the points $g, i$, and $l$ (Figure 12) were analytically determined considering the widths of the gaps of the wheel, already known above, just in correspondence of said points $g, i$ and $l$.

It is now necessary to examine how the contact extends between the teeth of the pinion and those of the gear wheel on the curves: $(l, a, b, c, d, x)$, $(e, f, g, z)$, $(h, i, r)$, $(i, n)$, $(2, s)$, $(2, v)$ (Figure 12).

Referring to the first of said curves, the curve $l, a, b, c, d, x$, it is evident that there cannot be a contact at the points $l, a, b$, at least at the points $l$ and $a$, owing to the manner in which the arc $a, b, c, d, e, f$ in Figure 9 has been modified according to arc $z, u, n, p, r, h, g, t$.

That notwithstanding, to facilitate understanding, it has first to be considered if there is a contact at the point $b$ (the symbols BD, BH $a$; $s$; $o$ which now and hereafter will be used for the points, have the same meaning as when Figure 1 was considered, and at the foot of them the letter or number will be noted relative to the point that will shortly be considered).

At the said point $b$ where the height of the teeth of the pinion is 2.40 mm. and the depth of the gaps between the teeth of the gear wheel is zero, there is:

$$\cos b\hat{O}O' = \frac{381^2 + 19.10^2 - 365.50^2}{2 \times 381 \times 19.10} = 0.820076$$

$$b\hat{O}O' = 34°54'26''$$

If one helix of the pinion in a complete retation (360°) axially advances for a pitch $p' = 57.15$ mm. (see (2)) at 34°54'27'' it advances by $$BD_b = 57.15 \frac{34°54'27''}{360°} = 5.541 \text{ mm.} \quad (45)$$

$$\cos b\hat{O}'O = \frac{365.50^2 + 381^2 - 19.10^2}{2 \times 365.50 \times 381} = 0.999552$$

$$\cos b\hat{O}'O = 1°42'54''$$

If the helix of the wheel in a complete rotation (360°) axially advances for a pitch $p'' = 2286$ mm. (see (3)), in 1°42'54'' it advances by $$BH_b = 2286 \frac{1°42'54''}{360°} = 10.890 \text{ mm.} \quad (46)$$

Remembering that (Table III) the width of the gaps of the wheel at the exterior periphery is 22.96 mm., it is possible to write $$SH_b = \frac{22.96}{2} = 11.48 \text{ mm.} \quad (47)$$

and for (46) and (47):

$$BS_b = SH_b - BH_b = 11.48 - 10.89 = 0.59 \text{ mm.} \quad (48)$$

and for the (45) and (48)

$$SD_b = BD_b + BS_b = 5.541 + 0.59 = 6.131 \text{ mm.}$$

The thickness which the teeth of the pinion should have at height 2.40 mm., in order that there shall be a contact at point $b$, should therefore be $2 \times 6.131 = 12.262$ mm. But it happens (Table IV) that at the said height the teeth of the pinion have the thickness of 11.608 mm.; than in the considered point $b$ of the teeth of the pinion there is no contact for a difference of $$12.262 - 11.608 = 0.654 \text{ mm.}$$

Proceeding now in exactly the same manner to control the contacts in all the following points, only mathematical calculations need be written down: Point $c$ at which the height of the teeth of the pinion is 3.60 mm. and the depth of the gaps between the teeth of the wheel is zero:

$$\cos c\hat{O}O' = \frac{381^2 + 17.90^2 - 365.50^2}{2 \times 381 \times 17.90} = 0.871798$$

$$c\hat{O}O' = 29°19'54''$$

$$BD_c = 57.15 \frac{29°19'54''}{360°} = 4.656 \text{ mm.} \quad (49)$$

$$\cos c\hat{O}'O = \frac{365.50^2 + 381^2 - 17.90^2}{2 \times 365.50 \times 381} = 0.999712$$

$$c\hat{O}'O = 1°22'30''$$

$$BH_c = 2286 \frac{1°22'30''}{360°} = 8.748 \text{ mm.} \quad (50)$$

But (Table III)

$$SH_c = \frac{22.96}{2} = 11.48 \text{ mm.} \quad (51)$$

it results, owing to (50) and (51)

$$BS_c = SH_c - BH_c = 11.48 - 8.748 = 2.732 \text{ mm.} \quad (52)$$

and for (49) and (52)

$$SD_c = BD_c + BS_c = 4.656 + 2.732 = 7.388 \text{ mm.}$$

The thickness the teeth of the pinion should have at height 3.60 mm. in order to have a contact at point $c$ should therefore be $2 \times 7.388 = 14.776$ mm. but Table IV gives the result that at the said height the thickness of the teeth of the pinion is 14.734 mm.; therefore there is no contact at the said point $c$ owing to the slight difference of $$14.776 - 14.734 = 0.042 \text{ mm.} \quad (53)$$

The distance of the point $c$ from the plane of the axes is $$365.50 \text{ sen } 1°22'30'' = 365.50 \times 0.023996 = 8.77 \text{ mm.} \quad (54)$$

Point $d$ in which the height of the teeth of the pinion is 4.80 mm. and the depth of the gaps between the teeth of the wheel is zero:

$$\cos d\hat{O}O' = \frac{381^2 + 16.70^2 - 365.50^2}{2 \times 381 \times 16.70} = 0.931180$$

$$\text{sine } d\hat{O}O' = 21°22'49''$$

$$BD_d = 57.15 \frac{21°22'49''}{360°} = 3.394 \text{ mm.} \quad (55)$$

$$\cos d\hat{O}'O = \frac{365.50^2 + 381^2 - 16.70^2}{2 \times 365.50 \times 381} = 0.999861$$

$$d\hat{O}'O = 0°57'15''$$

$$BH_d = 2286 \frac{0°57'15''}{360°} = 6.058 \text{ mm.} \quad (56)$$

But (Table III)

$$SH_d = \frac{22.96}{2} = 11.48 \text{ mm.} \quad (57)$$

it happens, owing to (56) and (57) that $$BS_d = SH_d - BH_d = 11.48 - 6.058 = 5.422 \text{ mm.} \quad (58)$$

and for (55) and (58)

$$SD_d = BD_d + BS_d = 3.394 + 5.422 = 8.816 \text{ mm.}$$

The thickness which the teeth of the pinion should have *ut* a height of 4.80 mm., in order to make contact at point $d$, should therefore be $2 \times 8.816 = 17.632$ mm.; but (Table IV) at the said height the thickness of the teeth of the pinion is 17.36 mm.; therefore there is no contact at point $d$ owing to the difference $$17.632 - 17.36 = 0.272 \text{ mm.}$$

Point $f$ at which the height of the teeth of the pinion is 2.40 mm. and the depth of the gaps between the teeth of the wheel is 1.20 mm.

$$\cos f\hat{O}O' = \frac{381^2 + 19.10^2 - 364.30^2}{2 \times 381 \times 19.10} = 0.880249$$

$$f\hat{O}O' = 28°19'39''$$

$$BD_f = 57.15 \frac{28°19'39''}{360°} = 4.496 \text{ mm.} \quad (59)$$

$$\cos f\hat{O}'O = \frac{364.30^2 + 381^2 - 19.10^2}{2 \times 364.30 \times 381} = 0.999690$$

$$f\hat{O}'O = 1°25'37''$$

$$BH_f = 2286 \frac{1°25'37''}{360°} = 9.061 \text{ mm.} \quad (61)$$

But (Table III)

$$SH_f = \frac{20.82}{2} = 10.41 \text{ mm.} \quad (62)$$

it results, that owing to (61) and (62)

$$BS_f = SH_f - BH_f = 10.41 - 9.061 = 1.349 \text{ mm.} \quad (63)$$

and owing to (59) and (62)

$$SD_f = BD_f + BS_f = 4.496 + 1.349 = 5.845 \text{ mm.}$$

The thickness the teeth of the pinion should have at height 2.40 mm. in order to have a contact at $f$ should therefore be $2 \times 5.845 = 11.69$ mm.; but (Table IV) at the said height the thickness of the teeth of the pinion is 11.608 mm.; therefore there is no contact at point $f$ owing to a difference of $$11.69 - 11.608 = 0.082 \text{ mm.} \quad (64)$$

Point $h$ in which the height of the teeth of the pinion is 1.20 mm. and the depth of the gaps between the teeth of the wheel is 2.40 mm.

$$\cos h\hat{O}O' = \frac{381^2 + 20.30^2 - 363.10^2}{2 \times 381 \times 20.30} = 0.887700$$

$$\cos h\hat{O}O' = 27°24'51''$$

$$BD_h = 57.15 \frac{27°24'51''}{360°} = 4.351 \text{ mm.} \quad (65)$$

$$\cos h\hat{O}'O = \frac{363.10^2 + 381^2 - 20.30^2}{2 \times 363.10 \times 381} = 0.999668$$

$$h\hat{O}'O = 1°28'37''$$

$$BH_h = 2286 \frac{1°28'37''}{360°} = 9.378 \quad (66)$$

But (Table III)

$$SH_h = \frac{18.34}{2} = 9.17 \text{ mm.} \quad (67)$$

it results owing to (66) and (67), that $$BS_h = BH_h - SH_h = 9.379 - 9.17 = 0.208 \text{ mm.} \quad (68)$$

and owing to (65) and (69)

$$SD_h = BD_h - BS_h = 4.351 - 0.208 = 4.143 \text{ mm.}$$

The thickness which the teeth of the pinion should have at 1.20 mm. in order to have a contact at point $h$, should therefore be $2 \times 4.143 = 8.286$ mm. but it is known (Table IV) that at a height of 1.20 mm. the teeth of the pinion have the thickness of 7.918 mm.; therefore there is no contact at point $h$ for a difference of $8.226 - 7.918 = 0.368$ mm.

Point 2 in which the height of the teeth of the pinion is zero and the depth of the gaps between the teeth of the wheel is 4.80 mm.

$$\cos 2\hat{O}O' = \frac{381^2 + 21.50^2 - 360.70^2}{2 \times 381 \times 21.50} = 0.947247$$

$$2\hat{O}O' = 18°41'36''$$

$$BD_2 = 57.15 \frac{18°41'36''}{360°} = 2.967 \text{ mm.} \quad (69)$$

$$\cos 2\hat{O}'O = \frac{360.70^2 + 381^2 - 21.50^2}{2 \times 360.70 \times 381} = 0.999817$$

$$2\hat{O}'O = 1°5'50''$$

$$BH_2 = 2286 \frac{1°5'50''}{360°} = 6.967 \text{ mm.} \quad (70)$$

But (Table III)

$$SH_2 = \frac{11.28}{2} = 5.64 \text{ mm.} \quad (71)$$

it results, owing to (70) and (71), that $$BS_2 = BH_2 - SH_2 = 6.967 - 5.64 = 1.327 \text{ mm.} \quad (72)$$

owing to (69) and (72)

$$SD_2 = BD_2 - BS_2 = 2.967 - 1.327 = 1.64 \text{ mm.}$$

The thickness which the teeth of the pinion should have at height zero, in order to have a contact at point 2, should therefore be $2 \times 1.64 = 3.20$ mm.; but (Table IV) at height zero, that is in correspondence of the heads of the teeth of the pinion the thickness is 3.20 mm. (see (16)); therefore there is no contact at point 2 for a difference of $3.28 - 3.20 = 0.08$ mm.

It is to be remembered that the distance between points $e$ and $r$ in Figure 9 is equal to 0.12 mm. (see the drawing of Figure 9) and it is also to be remembered that point $e$ refers to the arc by which the contact is obtained with the apex threads of the teeth of the pinion. But the definitive arc of the gaps of the wheel passes across point $r$. Therefore, according to Figure 9 at point $e$ there in no longer a contact with the apex threads of the teeth of the pinion for a difference of $0.12 \times 2 = 0.24$ mm. (It also must be remembered that, symmetrically to line $xx$, there also is the whole Figure 9; that is the reason why the said measurement 0.12 was multiplied by 2.)

It thus happens that the point $e$ and $r$ (Figure 9) refer both to a depth 4.80 mm. of the gaps between the teeth of the wheel, that is they refer to the depth at which point 2 is in Figure 12; point 2 also coincides with the apex threads of the teeth of the pinion. But it was remarked above that there is no contact at point 2 for a difference of 0.08 mm. and not of 0.24 mm. The real difference is the said one of measure 0.08 mm.; because, by the drawing at point 2, the distance was also considered for this same point 2 from the plane of the axes and above all the inclinations of the teeth of both the wheels referred to point 2 were considered.

It has been remarked above that there is no contact at point $c$ owing to the very slight difference (53) of 0.042 mm. and there is no contact at point $f$ owing to the difference (64) of 0.082 mm. Remembering that there is contact at point $g$ owing to the path of line E—R in Figure 10 (locking from R towards E), it has to be admitted that there is a contact of point $g$ till very near to point $c$ and from point $g$ till very near point $f$.

In order to demonstrate how far really the contact extends it must firstly be demonstrated how far the arc of contact of $g$—$f$ extends, because, as mentioned above the difference for obtaining a contact at point $f$ is more than the one for having a contact at point C.

The search will of course be done on arbitrary points, but naturally chosen according to the criterion due to knowledge of the work.

Point $f'$. It is first necessary to see if there is a contact at a point $f'$, placed on arc $f$—$g$, which is nearer to the plane of the axes for only $$0.20 \text{ mm.} \quad (73)$$

with respect to the distance of point $f$ from the same plane of the axes. This distance is found out in the following way:

Firstly it must be remembered that (60)

$$f\hat{O}'O = 1°25'37''$$

The distance of point $f$ from the plane of the axes is:

$$364.30 \text{ sen } 1°25'37'' = 364.30 \times 0.024900 = 9.071 \text{ mm.}$$

The distance of point $f'$ from the plane of the axes is therefore $$9.971 - 0.20 = 8.871 \text{ mm.} \quad (74)$$

The result of this subtraction may be accepted because the very short half-chord 0.20 mm., may be confused with the radius.

The radius of the pinion resulting at point $f'$ is now found:

$$\sqrt{364.30^2 - 8.871^2} = 364.192 \text{ mm.}$$

$$381 - 364.192 = 16.808 \text{ mm.}$$

and therefore the radius of the pinion at point $f'$ is $$\sqrt{8.871^2 + 16.808^2} = 19.005 \text{ mm.}$$

and the height of the teeth of the pinion at point $f'$ is:

$$21.50 - 15.005 = 2.495 \text{ mm.} \quad (75)$$

Proceeding with the same method used above, the result is obtained that:

$$\cos f'\hat{O}O' = \frac{381^2 + 19.005^2 - 364.30^2}{2 \times 381 \times 19.005} = 0.884399$$

$$f'\hat{O}O' = 27°49'21''$$

$$BD_{f'} = 57.15 \frac{27°49'21''}{360°} = 4.416 \text{ mm.} \quad (76)$$

$$\cos f'\hat{O}'O = \frac{364.30^2 + 381^2 - 19.005^2}{2 \times 364.30 \times 381} = 0.999703$$

$$f'\hat{O}'O = 1°23'45''$$

$$BH_{f'} = 2286 \frac{1°23'43''}{360°} = 8.863 \text{ mm.} \quad (77)$$

But (Table III)

$$SH_{f'} = \frac{20.82}{2} = 10.41 \text{ mm.} \quad (78)$$

it results that, owing to (77) and (78)

$$BS_{f'} = SH_{f'} - BH_{f'} = 10.41 - 8.863 = 1.547 \text{ mm.} \quad (79)$$

and owing to (76) and (79)

$$SD_{f'} = SD_{f'} + BS_{f'} = 4.416 \times 1.547 = 5.963 \text{ mm.}$$

The thickness which the teeth of the pinion must have at height 2.495 mm. in order to have a contact at point $f'$ must therefore be $2 \times 5.963 = 11.986$ mm. Noting, on the arc 3, 5, 6, 7, 8, 9, 10 (Fig. 9) the thickness that the teeth of the pinion have at a height (75) of 2.495 mm., it results that there is a contact at point $f'$. In fact from Figure 9 it can be remarked that the distance between point $k$ and its symmetrical one with respect to the axis of symmetry of Figure 9 is just between 11.92 mm. and 11.93 mm. and this measurement confirms that the contact takes place at point $f'$.

Point $z$ (Figure 12). For this point and for all the other following points the same above procedure already used for point $f'$ will be followed; point $z$ is placed on the arc $f$, $g$, $z$ having a radius of 364.30 mm.; by considering point $g$:

$$g\hat{O}'O = 0°59'30''$$

and therefore the distance of point $g$ from the plane of the axes is:

$$364.30 \cos 0°59'30'' = 364.30 \times 0.01707 = 6.304 \quad (80)$$

The distance of point $z$ from the plane of the axes is therefore:

$$6.304 - 0.20 = 6.104 \text{ mm.} \quad (81)$$

$$\sqrt{364.30^2 - 6.104^2} = 364.248 \text{ mm.}$$

$$381 - 364.248 = 16.752 \text{ mm.}$$

The radius of the pinion at point $z$ is:

$$\sqrt{6.104^2 + 16.752^2} = 17.829 \text{ mm.}$$

The height of the teeth of the pinion at point $z$ is:

$$21.50 - 17.820 = 3.671 \text{ mm.}$$

$$\cos z\hat{O}O' = \frac{381^2 + 17.829^2 - 364.30^2}{2 \times 381 \times 17.829} = 0.939546$$

$$z\hat{O}O' = 20°1'28''$$

$$BD_z = 57.15 \frac{20°1'28''}{360°} = 3.178 \text{ mm.} \quad (82)$$

$$\cos z\hat{O}'O = \frac{364.30^2 + 381^2 - 17.829^2}{2 \times 364.30 \times 381} = 0.999859$$

$$z\hat{O}'O = 0°57'45''$$

$$BH_z = 2286 \frac{0°57'45''}{360°} = 6.111 \text{ mm.} \quad (83)$$

But (Table III)

$$SH_z = \frac{20.82}{2} = 10.41 \text{ mm.} \quad (84)$$

therefore, owing to (83) and (84)

$$BS_z = SH_z - BH_z = 10.41 - 6.111 = 4.299 \text{ mm.} \quad (85)$$

and owing to (82) and (85)

$$SD_z = BD_z + BS_z = 3.178 + 4.299 = 7.477 \text{ mm.}$$

The thickness which the teeth of the pinion must have at height 3.671 mm. in order to have a contact at point $z$ must therefore be $2 \times 7.477 = 14.954$ mm. Reading the measurement of the drawing (Figure 9) the result is given that there is a contact at point $z$. So that on the arc $f$, $g$, $z$ there is a contact from point $f'$ till point $z$ and the length of this chord of the surface of contact is equal to the difference between the above calculated distances (74) and (81) for the points $f'$ and $a$ from the plane of the axis, that is:

$$8.871 - 6.104 = 2.767 \text{ mm.}$$

Point $x$ (Figure 12) placed at ⅓ of the distance between the points $g$ and $d$ starting from $d$; point $x$ is on the pinion at a radius $$16.70 + 0.40 = 17.10 \text{ mm.} \quad (86)$$

and on the wheel at a radius:

$$365.50 - 0.40 = 365.10 \text{ mm.}$$

$$\cos x\hat{O}O' = \frac{381^2 + 17.10^2 - 365.10^2}{2 \times 381 \times 17.10} = 0.932863$$

$$x\hat{O}O' = 21°6'51''$$

$$BD_x = 57.15 \frac{21°6'51''}{360°} = 3.351 \text{ mm.} \quad (87)$$

$$\cos x\hat{O}'O = \frac{365.10^2 + 381 - 17.10^2}{2 \times 365.10 \times 381} = 0.999857$$

$$x\hat{O}'O = 0°58'10''$$

$$BH_x = 2286 \frac{0°58'10''}{360°} = 6.155 \text{ mm.} \quad (88)$$

The width of the gaps of the wheel at depth of 0.40 mm., as it may be seen in the drawing of Figure 9, is 22.20 mm. so that:

$$SH_x = \frac{22.20}{2} = 11.10 \text{ mm.} \quad (89)$$

therefore, owing to (88) and (89)

$$BS_x = SH_x - BH_x = 11.10 - 6.125 = 4.495 \text{ mm.} \quad (90)$$

and for the (83) and (84):

$$SD_x = BD_x + BS_x = 3.351 + 4.945 = 8.296 \text{ mm.}$$

The thickness which the teeth of the pinion must have (considering the value 21.50 mm. of the external radius of the pinion and the above (86) calculated value) at height $$21.50 - 17.10 = 4.40 \text{ mm.}$$

in order to have a contact at point $x$ must therefore be: $2 \times 8.296 = 16.592$ mm. Reading the measurement on the drawing (Figure 9) this gives the result that there is a contact at point $x$.

The distance of point $x$ from the plane of the axes is:

$$365.10 \text{ sen } 0°58'10'' = 365.10 \times$$
$$0.016919 = 6.17 \text{ mm.} \quad (91)$$

Point $c'$ placed at the centre of arc $c$—$d$ and therefore distance 0.60 mm. from the circumference $r = 16.70$ mm. of the pinion, viz. that it is on the pinion at a radius:

$$16.70 \times 0.60 = 17.30 \text{ mm.} \quad (92)$$

and at a depth zero from the gaps of the gear wheel $$\cos c'\hat{O}O' = \frac{381^2 + 17.30^2 - 365.50^2}{2 \times 381 \times 17.30} = 0.900432$$

$$c'\hat{O}O' = 25°51'13''$$

$$BD_{c'} = 57.15 \frac{25°51'13''}{360°} = 4.104 \text{ mm.} \quad (93)$$

$$\cos c'\hat{O}'O = \frac{365.50^2 + 381^2 - 17.30^2}{2 \times 365.30 \times 381} = 0.999788$$

$$c'\hat{O}'O = 1°10'50''$$

$$BH_{c'} = 2286 \frac{1°10'50''}{360°} = 7.496 \text{ mm.} \quad (94)$$

But from the drawing (Fig. 9)

$$SH_{c'} = \frac{22.96}{2} = 11.48 \text{ mm.} \quad (95)$$

so that owing to (94) and (95)

$$BS_{c'} = SH_{c'} - BH_{c'} = 11.48 - 7.496 = 3.984 \text{ mm.} \quad (96)$$

and for the (93) and (96):

$$SD_{c'} = BD_{c'} + BS_{c'} = 4.104 + 3.984 = 8.088 \text{ mm.}$$

The thickness which the teeth of the pinion must have (considering the external radius of the pinion of 21.50 mm. and the (92) value calculated above) at height $$21.50 - 17.30 = 4.20 \text{ mm.}$$

in order to have a contact at point $c'$ must therefore be $2 \times 8.088 = 16.178$ mm. Reading the measure on the drawing (Figure 9) it gives the result 16.10 mm. Therefore there is no contact at point $c'$ owing to a difference of $$16.176 - 16.10 = 0.076 \text{ mm.} \quad (97)$$

Resuming it being known that there is a contact at points $f'$, $g$, $z$, $x$, by joining these four points and having the connecting line pass slightly underneath the points $c'$ and $c$ (more underneath point $c'$ because here the difference is (97) 0.076 mm., whilst in $c$ it is (53) 0.042 mm.) as a logic consequence, there is a contact on all the surface comprised within the line $f'$, $g$, $z$, $x$, $c'$, $c$, $f'$.

It is possible to have the mathematically expressed idea about how much the connecting line has to pass underneath the points $c'$ and $c$ by remembering that in point $f$ there is no contact (64) owing to a difference of 0.082 mm. and that the contact is at point $f'$ distant (73) from point $f$ only by 0.2 mm. Further, in order to have an exact idea of this work it must be remembered that the drawing (Figure 12) is on a scale that is three times actual size and that therefore is above the contact surface enlarged nine times with respect to the real one; therefore the chosen and joint points are very near one another.

In fact all the points are distant from one another by 1.20 mm. except the distance between points $f'$ and $g$ as this distance is, as calculated from (80) and (74), $$8.871 - 6.304 = 2.567 \text{ mm.}$$

Proceeding with the same method it happens that:

Point $h'$ placed on arc $h$—$i$ and nearer to the plane of the axes with respect to point $h$ by 0.90 mm.

$$h\hat{O}'O = 1°28'37''$$

The distance of point $h$ from the plane of the axes is:

$$363.10 \text{ sen } 1°28'37'' = 363.10 \times 0.025774 = 9.358 \text{ mm.} \quad (98)$$

The distance of point $h'$ from the plane of the axes is therefore:

$$9.358 - 0.90 = 8.458 \text{ mm.} \quad (99)$$

$$\sqrt{363.10^2 - 8.452^2} = 363.001 \text{ mm.}$$

$$381 - 363.001 = 17.999 \text{ mm.}$$

Point $h'$ is therefore on the pinion at a radius:

$$\sqrt{8.458^2 + 17.999^2} = 19.887 \text{ mm.}$$

and on the teeth of the wheel at height equal to:

$$21.50 - 19.887 = 1.613 \text{ mm.} \quad (100)$$

Now:

$$\cos h'\hat{O}O' = \frac{381^2 + 19.887^2 - 363.10^2}{2 \times 381 \times 19.887} = 0.905047$$

$$h'\hat{O}O' + 25°10'13''$$

$$BD_{h'} = 57.15 \frac{25°10'13''}{360°} = 3.995 \text{ mm.} \quad (101)$$

$$\cos h'\hat{O}O = \frac{363.10^2 + 381^2 - 19.887^2}{2 \times 363.10 \times 381} = 0.999728$$

$$h'\hat{O}'O = 1°20'10''$$

$$BH_{h'} = 2286 \frac{1°20'10''}{360°} = 0.484 \text{ mm.} \quad (102)$$

But in the drawing (Figure 9) for the considered depth it results $$SH_{h'} = \frac{18.34}{2} = 9.17 \text{ mm.} \quad (103)$$

Owing to (102) and (103) it therefore results that $$BS_{h'} = SH_{h'} - BH_{h'} = 9.17 - 8.484 = 0.686 \text{ mm.}$$

and for (101) and (104)

$$SD_{h'} = BD_{h'} + BS_{h'} = 3.995 + 0.686 = 4.681 \text{ mm.} \quad (104)$$

The thickness which the teeth of the pinion must have at height $$1.613 \text{ mm.} \quad (105)$$

in order to have a contact at point $h'$ must therefore be $2 \times 4.681 = 9.363$ mm. Reading the measure on the drawing (Figure 9) it results that there is a contact at point $h'$.

Point $r$ placed on the extension of arc $h$—$i$ and nearer to the plane of the axes, with respect to point $l$, for 0.70 mm.

$$l\hat{O}'O = 1°1'40''$$

The distance of point $l$ from the plane of the axes is:

$$363.10 \text{ sine } 1°1'40'' = 363.10 \times 0.017937 = 6.512 \text{ mm.}$$

The distance from point $r$ from the plane of the axes is:

$$6.512 - 0.70 = 5.812 \text{ mm.} \quad (106)$$

$$\sqrt{363.10^2 - 5.812^2} = 363.053 \text{ mm.}$$

$$381 - 363.053 = 17.947 \text{ mm.}$$

Point $r$ is placed on the pinion in correspondence to a radius $$\sqrt{5.812^2 + 17.947^2} = 18.864 \text{ mm.}$$

and at a height on the teeth of the pinion corresponding to $$21.50 - 18.864 = 2.636 \text{ mm.} \quad (107)$$

Now:

$$\cos r\hat{O}O' = \frac{381^2 + 18.864^2 - 363.10^2}{2 \times 381 \times 18.864} = 0.951364$$

$$r\hat{O}O' = 17°56'34''$$

$$BD_r = 57.15 \frac{17°56'36''}{360°} = 2.848 \text{ mm.} \quad (108)$$

$$\cos r\hat{O}'O = \frac{363.10^2 + 381^2 - 18.864^2}{2 \times 363.10 \times 381} = 0.999871$$

$$r\hat{O}'O = 0°55'15''$$

$$BD_r = 2286 \frac{0°55'15''}{360°} = 5.547 \text{ mm.} \quad (109)$$

But, from the drawing (Figure 9) for the considered depth it is found to be $$SH_r = \frac{18.34}{2} = 9.17 \text{ mm.} \quad (110)$$

and it results, owing to (110) and (109) that $$BS_r = SH_r - BH_r = 9.17 - 5.847 = 3.323 \text{ mm.} \quad (111)$$

and for the (108) and (111):

$$SD_r = BD_r + BS_r = 2.848 + 3.323 = 6.171 \text{ mm.}$$

The thickness which the teeth of the pinion must have at height (107) 2.636 mm. in order to have a contact at the point $r$ must therefore be $2 \times 6.171 = 12.342$ mm. Reading the measurement on the drawing (Figure 9) it results that there is contact at point $r$.

Point $1'$ placed on the extention of arc $n$—$l$ and farther off from the plane of the axes with respect to point 1 for 1 mm.

$$1\hat{O}'O = 1°3'3''$$

The distance of point 1 from the plane of the axes is:

$$361.90 \text{ sen } 1°3'30'' = 361.90 \times 0.018470 = 6.684 \text{ mm.} \quad (112)$$

The distance of point $1'$ from the plane of the axes is $$6.684 + 1 = 7.684 \text{ mm.} \quad (113)$$

$$\sqrt{361.90^2 - 7.684^2} = 361.818 \text{ mm.}$$

$$381 - 361.818 = 19.182 \text{ mm.}$$

The point $1'$ is placed on the pinion at a radius $$\sqrt{7.684^2 + 19.182^2} = 20.663$$

and at a height on the teeth of $$21.50 - 20.863 = 0.837 \text{ mm.} \quad (114)$$

Now $$\cos 1'\hat{O}O' = \frac{381^2 + 20.663^2 - 361.90^2}{2 \times 381 \times 20.663} = 0.928306$$

$$1'\hat{O}O' = 21°49'40''$$

$$BD_{1'} = 57.15 \frac{21°49'40''}{360°} = 3.465 \text{ mm.} \quad (115)$$

$$\cos 1'\hat{O}'O = \frac{361.90^2 + 381^2 - 20.663^2}{2 \times 361.90 \times 381} = 999774$$

$$1'\hat{O}'O = 1°13'0''$$

$$BH_{1'} = 2286 \frac{1°13'0''}{360°} = 7.725 \text{ mm.} \quad (116)$$

But in the drawing (Figure 9) for the considered depth, it is noted to be $$SH_{1'} = \frac{15.24}{2} = 7.62 \text{ mm.} \quad (117)$$

it results that, owing to (116) and (117)

$$BS_{1'} = BH_{1'} - SH_{1'} = 7.725 - 7.62 = 0.105 \text{ mm.} \quad (118)$$

and for (115) and (116)

$$SD_{1'} = BD_{1'} - BS_{1'} = 3.465 - 0.105 = 3.36 \text{ mm.}$$

The thickness which the teeth of the pinion must have at height $$0.837 \text{ mm.} \quad (119)$$

in order to have a contact at point $1'$ must therefore be $2 \times 3.36 = 6.72$ mm. Reading the measure on the drawing (Fig. 9) it results that there is a contact at point $1'$;

Point $n$ placed on the extension of the arc passing across 1 and nearer to the plane of the axes with respect to the same 1 of 1.10 mm.

It has been noted (112) that the distance of point 1 from the plane of the axes is 684 mm. Therefore the point $n$ is distant from the plane of the axes $$6.684 - 1.10 = 5.584 \text{ mm.} \quad (120)$$
$$\sqrt{361.90^2 - 5.584^2} = 361.856 \text{ mm.}$$
$$381 - 361.856 = 19.144 \text{ mm.}$$

Point $n$ is on the pinion at a radius of $$\sqrt{5.584^2 + 19.144^2} = 19.941 \text{ mm.}$$

and on the pinion at height $$21.50 - 19.941 = 1.559 \text{ mm.}$$

Now $$\cos n\hat{O}O' = \frac{381^2 + 19.941^2 - 361.90^2}{2 \times 381 \times 19.941} = 0.959988$$

$$n\hat{O}O' = 16°15'38''$$

$$BD_n = 57.15 \frac{16°15'38''}{360°} = 2.581 \text{ mm.} \quad (121)$$

$$\cos n\hat{O}'O = \frac{361.90^2 + 381^2 - 19.941^2}{2 \times 361.90 \times 381} := 0.999880$$

$$n\hat{O}'O = 0°53'15''$$

$$BH_n = 2286 \frac{0°53'15''}{360°} = 5.635 \text{ mm.} \quad (122)$$

But from the drawing (Figure 9), for the considered depth it is $$SH_n = \frac{15.24}{2} = 7.62 \text{ mm.} \quad (123)$$

it results, owing to (123) and (122) that $$BS_n = SH_n - BH_n = 7.62 - 5.635 = 1.985 \text{ mm.} \quad (124)$$

and, for the (121) and (122)

$$SD_n\ BD_n + BS_n = 2.581 + 1.985 = 4.566 \text{ mm.}$$

The thickness which the teeth of the pinion must have at height 1.559 mm. in order to have a contact at point $n$ must therefore be $2 \times 4.566 = 9.132$ mm. Reading the measurement on the drawing (Figure 9) this shows that there is contact at point $n$.

Point $2a$ placed on the arc $2-s$ and nearer to the plane of the axes with respect to the point 2 by 0.20 mm.

$$2'O = 1°5'50''$$

The distance of point 2 from the plane of the axes is: $360.70 \text{ sen } 1°5'' = 360.70 \times$ $$0.019148 = 6.906 \text{ mm.} \quad (125)$$

the distance of point $2a$ from the plane of the axes is therefore:

$$6.906 - 0.20 = 6.706 \text{ mm.} \quad (126)$$

$$\sqrt{360.70^2 - 6.706^2} = 360.637 \text{ mm.}$$

$$381 - 360.637 = 20.363 \text{ mm.}$$

The point $2a$ is placed on the pinion on a radius:

$$\sqrt{6.706^2 + 20.363^2} = 21.438 \text{ mm.}$$

and on the teeth of the pinion at a height $$21.50 - 21.438 = 0.062$$

Now $$\cos 2a\hat{O}O' = \frac{381^2 + 21.438^2 - 360.70^2}{2 \times 381 \times 21.438} = 0.949826$$

$$2a\hat{O}O' = 18°13'36''$$

$$BD_{2a} = 57.15 \frac{18°13'36''}{360°} = 2.893 \text{ mm.} \quad (127)$$

$$\cos 2a\hat{O}'O = \frac{360.70^2 + 381 - 21.438^2}{2 \times 360.70 \times 381} = 0.999827$$

$$\cos 2a\hat{O}'O = 1°4'0''$$

$$BH_{2a} = 2286 \frac{1°4'0''}{360°} := 4.773 \text{ mm.} \quad (128)$$

But from the drawing (Figure 9) for the depth considered there is:

$$SH_{2a} = \frac{11.28}{2} = 5.64 \quad (129)$$

Owing to (128) and (129)

$$BS_{2a} = BH_{2a} - SH_{2a} = 6.773 - 5.64 = 1.133 \text{ mm.} \quad (130)$$

and owing to (127) and (130)

$$SD_{2a} = BD_{2a} - BS_{2a} = 2.893 - 1.133 = 1.76 \text{ mm.}$$

The thickness which the teeth of the pinion must have at height 0.062 mm. in order to have a contact at point $2a$ must therefore be $2 \times 1.76 = 3.52$ mm. Reading the measurement on the drawing (Figure 9) this gives the result that there is a contact at point $2a$.

Point $2b$ placed on the arc $2-s$, and nearer to the plane of the axes, with respect to the point 2, by 1.20 mm.

It is already known that (125) the distance of point 2 from the plane of the axes is 6.906 mm.; and therefore the distance of the point $2b$ from the plane of the axes is $$6.906 - 1.20 = 5.706 \text{ mm.}$$

$$\sqrt{360.70^2 - 5.706^2} = 360.654 \text{ mm.}$$

$$381 - 360.654 = 20.346 \text{ mm.}$$

The point $2b$ is placed on the pinion at a radius $$\sqrt{5.706^2 + 20.346^2} = 21.130 \text{ mm.}$$

and on the tooth of the pinion at height $$21.50 - 21.13 = 0.37 \text{ mm.}$$

$$\cos 2b\hat{O}O' = \frac{381^2 + 21.13^2 - 360.70^2}{2 \times 381 \times 21.13} = 0.962857$$

$$2b\hat{O}O' = 15°39'53''$$

$$BD_{2b} = 57.15 \frac{15°39'53''}{360°} = 2.486 \text{ mm.} \quad (131)$$

$$\cos 2b\hat{O}'O = \frac{360.70^2 + 381^2 - 21.13^2}{2 \times 360.70 \times 381} = 0.999874$$

$$\cos 2b\hat{O}'O = 0°54'30''$$

$$BD_{2b} = 2286 \frac{0°54'30''}{360°} = 5.767 \text{ mm.} \quad (132)$$

But, from the drawing (Figure 9) for the depth considered it is $$SH_{2b} = \frac{11.28}{2} = 5.64 \text{ mm.} \quad (133)$$

Thus, owing to (132) and (133)

$$BS_{2b} = BS_{2b} - SH_{2b} = 5.767 - 5.64 = 0.127 \text{ mm.} \quad (134)$$

and, for (131) and (134)

$$SD_{2b} = BD_{2b} - BS_{2b} = 2.486 - 0.127 = 2.359 \text{ mm.}$$

The thickness which the teeth of the pinion must have at height 0.37 mm. in order to make contact at point $2b$ must therefore be $2 \times 2.359 = 4.718$ mm. Reading the measurement on the drawing (Figure 9) it will be seen that there is a contact at point $2b$.

Point $s$ which is nearer to the plane of the axes with respect to point 2 by 2.40 mm.

It is known (124) that the distance of point 2 from the plane of the axes is 6.906 mm.; therefore the distance of point $s$ from the plane of the axes is:

$$6.906 - 2.40 = 4.506 \text{ mm.} \quad (135)$$

$$\sqrt{360.70^2 - 4.506^2} = 360.671 \text{ mm.}$$

$$381 - 360.671 = 20.329 \text{ mm.}$$

The point $s$ is on the pinion at a radius:

$$\sqrt{4.506^2 + 20.329^2} = 20.822 \text{ mm.}$$

and on the teeth of the pinion at height:

$$21.50 - 20.822 = 0.678 \text{ mm.}$$

Now:

$$\cos s\hat{O}O' = \frac{381^2 + 20.822^2 - 360.70^2}{2 \times 381 \times 20.822} = 0.976283$$

$$s\hat{O}O' = 12°30'12''$$

$$BS_s = 57.15 \frac{12°30'12''}{360°} = 1.984 \quad (136)$$

$$\cos s\hat{O}'O = \frac{360.70^2 + 381^2 - 20.822^2}{2 \times 360.70 \times 381} = 0.999921$$

$$s\hat{O}'O = 0°43'15''$$

$$BH_s = 2286 \frac{0°43'15''}{360°} = 4.577 \text{ mm.} \quad (137)$$

But from the drawing (Figure 9) for the considered depth it is $$SH_s = \frac{11.28}{2} = 5.64 \text{ mm.} \quad (138)$$

Thus owing to (138) and (137)

$$BS_s = SH_s - BH_s = 5.64 - 4.577 = 1.063 \text{ mm.} \quad (139)$$

and for (136) and (139)

$$SD_s = BD_s + BS_s = 1.984 + 1.063 = 3.047 \text{ mm.}$$

The thickness which the teeth of the pinion must have at height 0.678 mm. in order to have a contact at point $s$ must therefore be $2 \times 3.047 = 6.094$ mm. Reading the measurement on the drawing it will be seen that there is a contact at point $s$.

The manner in which the contact on arc $2-r$ extends will now be examined; that is the contact between the head threads of the teeth of the pinion and the gaps of the wheel extending along the arc $2-v$.

It is already known that at point 2, in which the depth of the gaps of the wheel is 4.80 mm. there is no contact.

Consider (Fig. 12) the point $3a$ on the radius 21.55 mm. at depth 5.10 mm. of the gaps of the wheel and therefore distant from $O'$.

$$3aO' = 360.40 \text{ mm.} \quad (140)$$

$$\cos 3a\hat{O}O' = \frac{381^2 + 421.50^2 - 360.40^2}{2 \times 381 \times 21.50} = 0.960452$$

$$3a\hat{O}O' = 16°10'2''$$

$$nh_{3a} = 57.15 \frac{16°10'2''}{360°} = 2.566 \text{ mm.} \quad (141)$$

in order to remember the meaning of $nh$, (see Figure 8)

$$\cos 3a\hat{O}'O = \frac{360.40^2 + 381^2 - 21.50^2}{2 \times 360.40 \times 381} = 0.999862$$

$$3a\hat{O}'O = 0°57'0'' \quad (142)$$

$$ne_{3a} = 2286 \frac{0°57'0''}{360°} = 6.032 \text{ mm.} \quad (143)$$

as a reminder of the meaning on $ne$ (see Figure 8).
But owing to (143) and (141)

$$he_{3a} = ne_{3a} - nh_{3a} = 6.032 - 2.566 = 3.466 \text{ mm} \quad (144)$$

(as a reminder of the meaning of $hi$ and the meaning of the following symbol $ie$ (see Figure 8).

$$hi = \frac{3.20}{2} = 1.60 \text{ mm.} \text{ (see (16))} \quad (145)$$

and for (145) and (144).

$$1e_{3a} = hi + he_{3a} = 1.60 + 9.466 = 5.066 \text{ mm.}$$

The width of the gaps between the teeth of the wheel must have a depth of 5.10 mm. in order to have a contact with the apex threads of the teeth of the pinion must therefore be $2 \times 5.0666 = 10.132$ mm. Reading the corresponding measurement at depth 5.10 mm. on the arc $g, h, r, p, n, u, z$, in Figure 9 gives the result that for said point $3a$ there is a contact.

The distance of said point of contact $3a$ from the plane of the axes $OO'$ owing to (140) and (142) is:

$$360.40 \text{ sen } 0°57'0'' = 360.40 \times 0.016580 = 5.97 \text{ mm.} \quad (146)$$

Consider (Figure 12) the point $4a$ (Figure 12) on the radius of 21.50 mm. of the pinion at depth 5.30 mm. of the gaps between the teeth of the wheel and therefore distant from $O'$ $$4aO' = 360.20 \text{ mm.} \quad (147)$$

$$\cos 4a\hat{O}O' = \frac{381^2 + 21.50^2 - 360.20^2}{2 \times 381 \times 21.50} = 0.969249$$

$$4a\hat{O}O' = 14°14'45''$$

Using for the symbols the same method used when point $3a$ was considered there is:

$$nh_{4a} = 57.15 \frac{14°14'45''}{360°} = 2.261 \text{ mm.} \quad (148)$$

$$\cos 4a\hat{O}'O = \frac{360.20^2 + 381^2 - 21.50^2}{2 \times 360.20 \times 381} = 0.999892$$

$$4a\hat{O}'O = 0°50'30'' \quad (149)$$

$$ns_{4a} = 2286 \frac{0°50'30''}{360°} = 5.344 \text{ mm.} \quad (150)$$

But, owing to (148) and 150), there is:

$$he_{4a} = ne_{4a} - nh_{4a} = 5.344 - 2.261 = 3.083 \text{ mm.} \quad (151)$$

$$hi = \frac{3.20}{2} = 1.60 \text{ mm. (see (16))}$$

and, for the (152) and (151), there results:

$$ie_{4a} = hi + he_{4a} = 1.60 + 3.083 = 4.683 \text{ mm.}$$

The width the gaps between the teeth of the wheel must have at depth 5.30 mm. in order to have a contact with the apex threads of the teeth of the pinion in correspondence with point $4a$ must therefore be $2 \times 4.683 = 9.366$ mm. Reading the measure corresponding to the depth 5.30 mm. on the arc $g, h, r, p, n, u, z$ in Figure 9 it is apparent that for said point $4a$ there is a contact.

Consider (Figure 12) the point $v$ on the radius 21.50 mm. of the pinion at depth 5.60 mm. of the gaps between the teeth of the wheel and therefore distant from $O'$;

$$vO' = 365.50 - 5.60 = 359.90 \text{ mm.} \quad (153)$$

The said point corresponds to the vertex of the curvilinear triangle defining the affirmed out-line of the surface of contact.

$$\cos v\hat{O}O' = \frac{381^2 + 21.50^2 - 359.90^2}{2 \times 381 \times 21.50} = 0.982435$$

$$v\hat{O}O' = 10°45'16''$$

$$nh_v = 57.15 \frac{10°45'16}{360°} = 1.707 \text{ mm.} \quad (154)$$

$$\cos v\hat{O}'O = \frac{359.90^2 - 381^2 - 21.50^2}{2 \times 359.50 \times 381} = 0.999937$$

$$v\hat{O}'O = 0°38'30'' \quad (155)$$

$$ne_s = 2286 \frac{0°38'30''}{360°} = 4.074 \text{ mm}. \quad (156)$$

But, owing to (154) and (156), there is $$he_s = ne_s - nh_s = 4.074 - 1.707 = 2.367 \text{ mm}. \quad (157)$$

$$hi = \frac{3.20}{2} = 1.60 \text{ mm. (see (16))}$$

and, for (158) and (157), it happens that $$iev = hi + hev = 1.60 + 2.367 = 3.967 \text{ mm}.$$

The width which the gaps of the wheel must have at depth 5.60 mm. in order to have a contact with the head thread of the teeth of the pinion at point $v$ must therefore be equal to $2 \times 3.967 = 7.934$ mm. Reading the measurement corresponding to depth 5.60 mm. on the arc $g$, $h$, $r$, $p$, $n$, $u$, $v$, $z$ in Figure 9 it will be seen that for the said point $v$ there is a contact.

The distance of point $v$ from the plane of the axes, for (153) and (155), is equal to:

$$359.90 \sin 0°38'30'' = 359.90 \times$$
$$0.011199 = 4.03 \text{ mm}. \quad (159)$$

On the arc $2-v$ then the said points of contact $3a$, $4a$ and $v$ (Figure 12) were determined with the object of demonstrating the continuity of contact on the same arc, notwithstandingly confirmed by the very short distance from one point to the other. So that what was done on the arches $c-d$, $f-z$, $h-r$, $i-n$, $2-s$, has been reported on the arc $2-v$. It is evident that joining and connecting with care all the extreme points of all the said arches the entire surface of contact comprised in line $v$, $s$, $h$, $r$, $z$, $x$, $c$, $f'$, $h'$, $l'$, $2a$, $3a$, $4a$, $v$ (as it has been affirmed) will result.

In order to facilitate the execution of the drawing of the external outline of the said surface of contact the calculated values are incorporated in the following table.

*Table V*

Distance from the plane of the axes of the points of outline of the surface of contact.

| | | | |
|---|---|---|---|
| Point $c$ is distant | 8.77 mm. | (54) |
| Point $x$ is distant | 6.17 mm. | (91) |
| Point $f'$ is distant | 8.87 mm. | (74) |
| Point $z$ is distant | 6.10 mm. | (81) |
| Point $h'$ is distant | 8.45 mm. | (99) |
| Point $r$ is distant | 5.81 mm. | (106) |
| Point $l'$ is distant | 7.68 mm. | (113) |
| Point $n$ is distant | 5.58 mm. | (120) |
| Point $2a$ is distant | 6.70 mm. | (126) |
| Point $s$ is distant | 4.50 mm. | (135) |
| Point $3a$ is distant | 5.97 mm. | (146) |
| Point $v$ is distant | 4.03 mm. | (159) |

The whole therefore confirms the existence of the characteristics of the teeth affirmed at the beginning.

Having thus drawn the surface of contact it is possible also to find out its extent by following any one of the many known methods: this results, with great approximation, for the shown example in a figure of 14 mm.$^2$.

There is a surface of such a kind for each couple of teeth in contact according to the invention, it is continuous, constant, that is it does not undergo variations in its shape, its dimensions and its position during the rotation of the wheels, except for considerations of a secondary kind which it is not worth while to consider here.

What I claim is:

1. A pair of reversible gears having helicoidal teeth and running between parallel axes, the helices of the teeth of the pinion and those of the gear wheel having different inclinations with respect to their respective axes, the helices of the teeth of the pinion and those of the gear wheel having different inclinations with respect to their respective axes, the helices of the teeth of the pinion and those of the gear wheel having equal axial pitches, the contact between a tooth of the pinion and a tooth of the gear wheel occurring on a surface of contact that is shifted in relation to the plane of the axes of the gears, the lateral shapes of the sections of the teeth on both the pinion and the gear wheel being each a single arc of a circle.

2. A pair of gears as claimed in claim 1, in which the centers of the arcuate sections of the teeth of the pinion are internal to the tangent to the circle of the root-line of such teeth and, the centers of the arcuate sections of the teeth are outside the circle containing the tips of the teeth, so that the thickness of the shapes constantly increases from the head to the root both for the pinion and for the gear wheel.

3. A pair of gears as claimed in claim 2, in which the contacts between one tooth of the pinion and one tooth of the gear wheel occurs on a surface of contact that is shifted with respect to the plane of the axes and is completely outside it, on one side or the other, according to the direction of rotation of the gears, the outline, the extent and the distance from the plane of the axes of said surface of contact being a function of the inclinations of the helices of the teeth both of the gear wheel and of the pinion, and having substantially the shape of a curvilinear triangle with the short side or base directed toward the plane of the axes and having the long curvilinear sides extending approximately in a direction along the plane of the axes.

4. A pair of gears as claimed in claim 3, in which the meeting vertex of the longer curvilinear sides of the curvilinear triangle constituting the perimeter of the surface of contact is closer to the plane of the axes than the other side or base of the triangle.

5. A pair of gears as claimed in claim 4, in which the center of gravity is nearer to the root of the tooth of the gear wheel than to the root of the tooth of the pinion with which such first tooth is in contact, whereby the unitary pressure in the various points of the surface of contact is variable.

6. A pair of gears as claimed in claim 5, in which between the lateral sides of the cross section of the teeth and the cylinder at the root of the teeth and of the outside-line of the teeth there are smooth lines, whereby those portions of the teeth where the highest unitary pressure would otherwise occur are eliminated.

No references cited.